US009360263B2

(12) United States Patent
Raczek et al.

(10) Patent No.: US 9,360,263 B2
(45) Date of Patent: Jun. 7, 2016

(54) PROPELLANT CHARGE MAGAZINE AND COMBAT COMPARTMENT EQUIPPED WITH A PROPELLANT CHARGE MAGAZINE

(75) Inventors: Matthias Raczek, München (DE); Heinrich Heldmann, München (DE)

(73) Assignee: KRAUSS-MAFFEI WEGMANN GMBH & CO. KG, Munich (DE)

( * ) Notice: Subject to any disclaimer, the term of this patent is extended or adjusted under 35 U.S.C. 154(b) by 961 days.

(21) Appl. No.: 13/516,561

(22) PCT Filed: Dec. 3, 2010

(86) PCT No.: PCT/DE2010/075154
§ 371 (c)(1),
(2), (4) Date: Sep. 11, 2012

(87) PCT Pub. No.: WO2011/072673
PCT Pub. Date: Jun. 23, 2011

(65) Prior Publication Data
US 2012/0325075 A1    Dec. 27, 2012

(30) Foreign Application Priority Data

Dec. 17, 2009   (DE) .......................... 10 2009 058 567

(51) Int. Cl.
*F41A 9/37*   (2006.01)
*B60H 1/00*   (2006.01)
*F41H 7/03*   (2006.01)

(52) U.S. Cl.
CPC ............ *F41A 9/375* (2013.01); *B60H 1/00414* (2013.01); *F41H 7/035* (2013.01)

(58) Field of Classification Search
CPC .............................. B60H 1/00414; F41H 7/03
See application file for complete search history.

(56) References Cited

U.S. PATENT DOCUMENTS 2,752,094 A * 6/1956 Dunham ...................... 236/1 R
4,864,913 A * 9/1989 Grunewald et al. ............... 89/34
5,153,367 A * 10/1992 Markquart et al. .......... 89/1.816
(Continued)

FOREIGN PATENT DOCUMENTS

DE          977753    *  9/1969
DE         2040285       3/1972
(Continued)

OTHER PUBLICATIONS

Translation of DE 102004025743 A1.*
(Continued)

*Primary Examiner* — Troy Chambers
*Assistant Examiner* — Joshua Semick
(74) *Attorney, Agent, or Firm* — Thompson Hine LLP

(57) ABSTRACT

A propellant charge magazine having a magazine housing in which propellant charges are disposed and that can be cooled by a device for distribution and/or discharge of cooling air disposed in, or within the immediate vicinity of, the propellant charge magazine. A cooling air distribution system can be disposed in a combat compartment housing, with an air discharge device thereof being disposed in an upper portion of the housing for guiding cooling air into a lateral area of the housing. A deflector guides the cooling air downwardly in the lateral area and upwardly in a central area of the housing.

15 Claims, 6 Drawing Sheets

(56) References Cited

U.S. PATENT DOCUMENTS

| | | |
|---|---|---|
| 5,472,378 A | 12/1995 | Skoff |
| 2005/0087332 A1* | 4/2005 | Umeo et al. ............ 165/202 |
| 2008/0096481 A1* | 4/2008 | Spaggiari .................. 454/137 |

FOREIGN PATENT DOCUMENTS

| | | |
|---|---|---|
| DE | 4134603 | 4/1993 |
| DE | 19720815 | 11/1998 |
| DE | 102004025743 A1 * | 12/2005 ............... F41A 9/10 |
| EP | 0637728 | 2/1995 |
| EP | 1060917 | 12/2000 |

OTHER PUBLICATIONS

PCT, International Search Report; International Patent Application No. PCT/DE2010/075154 (Jun. 28, 2011).

* cited by examiner

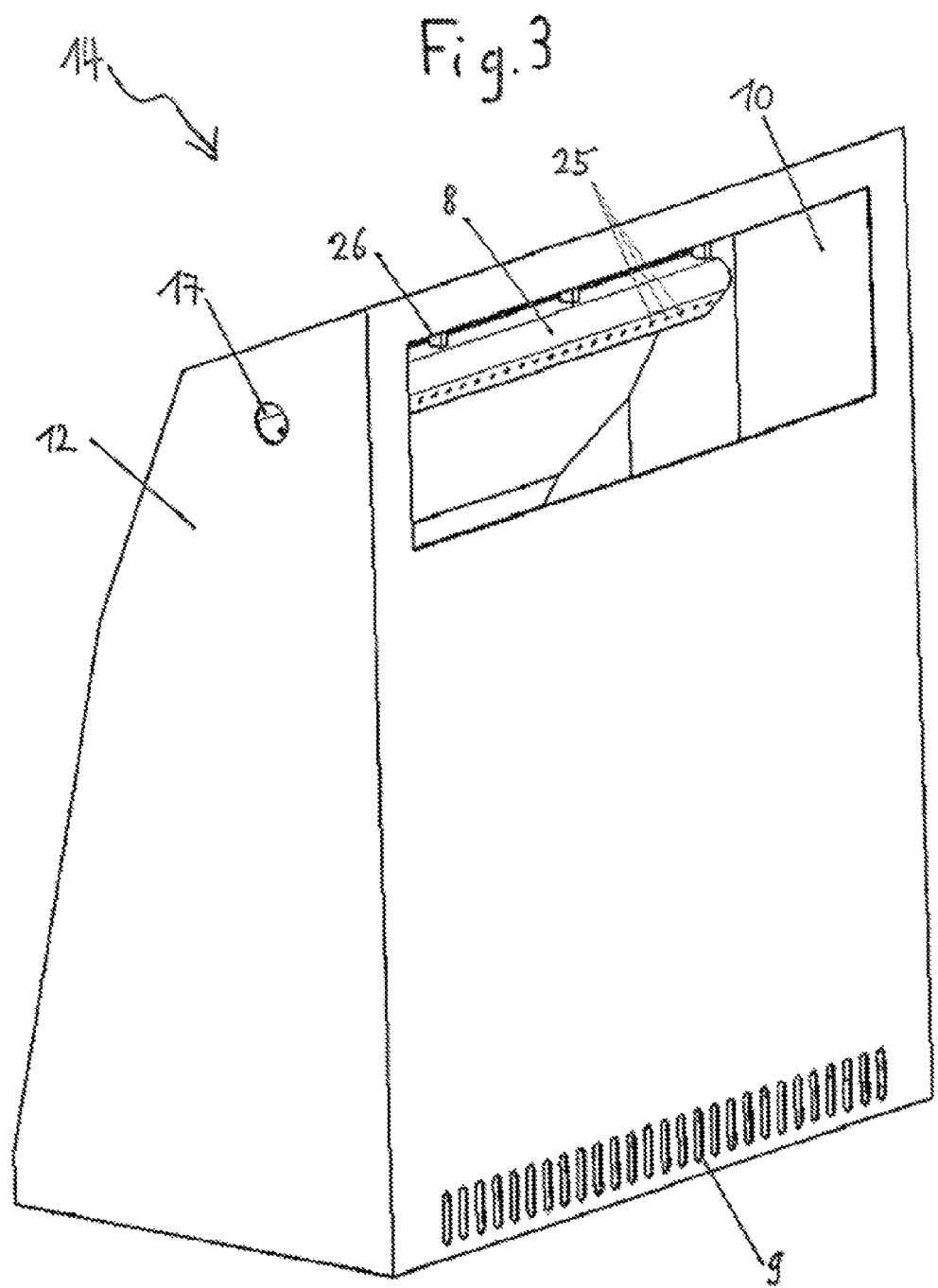

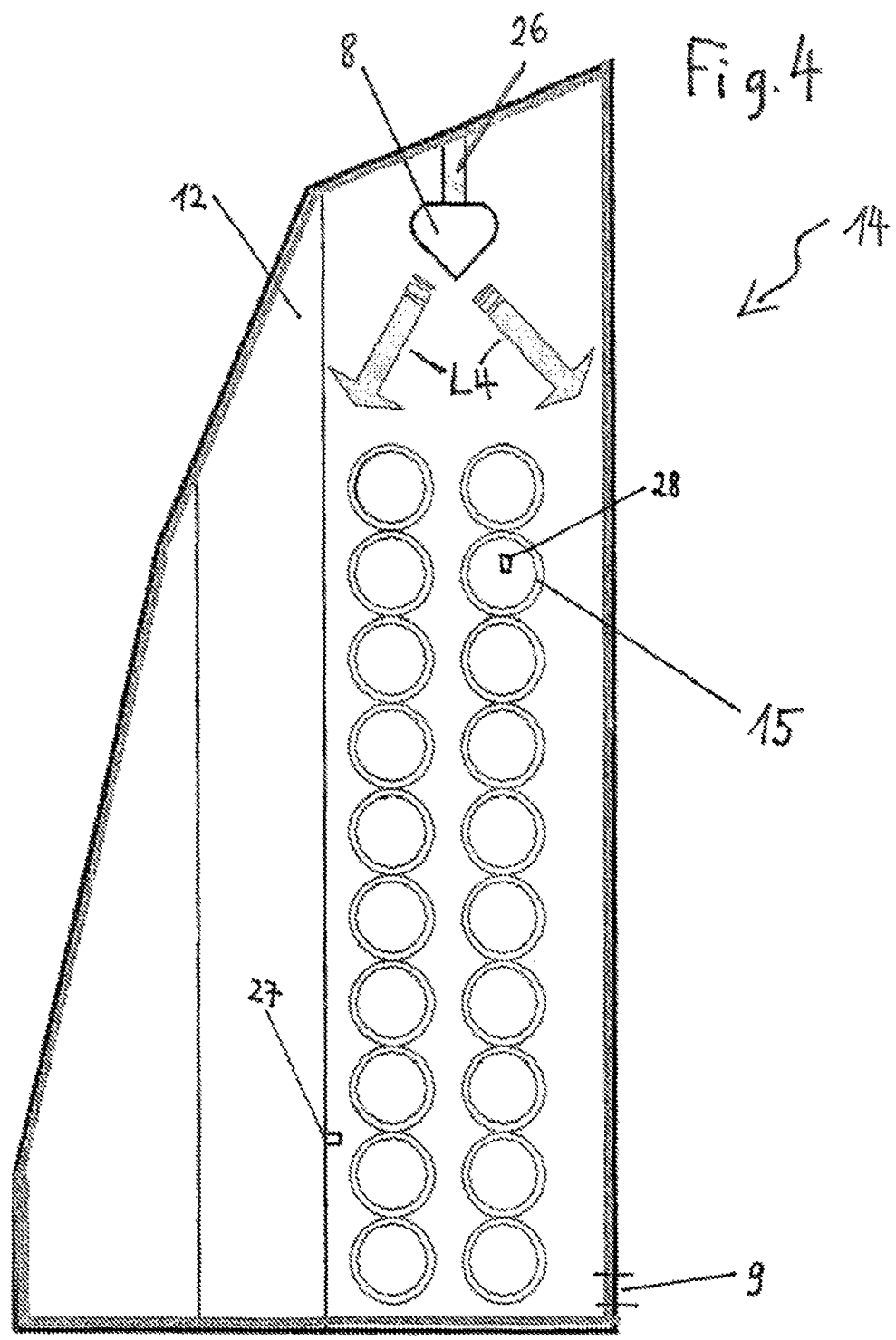

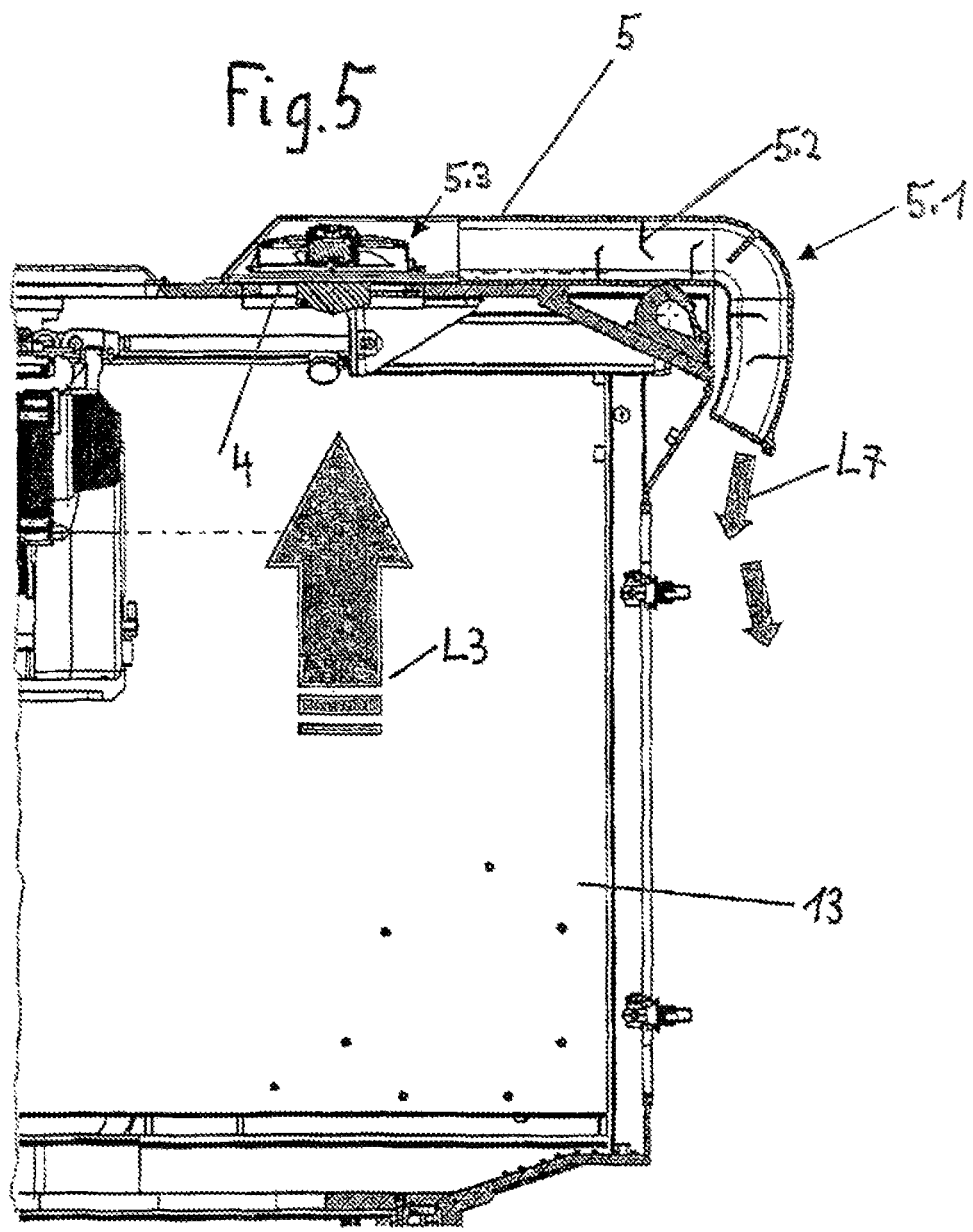

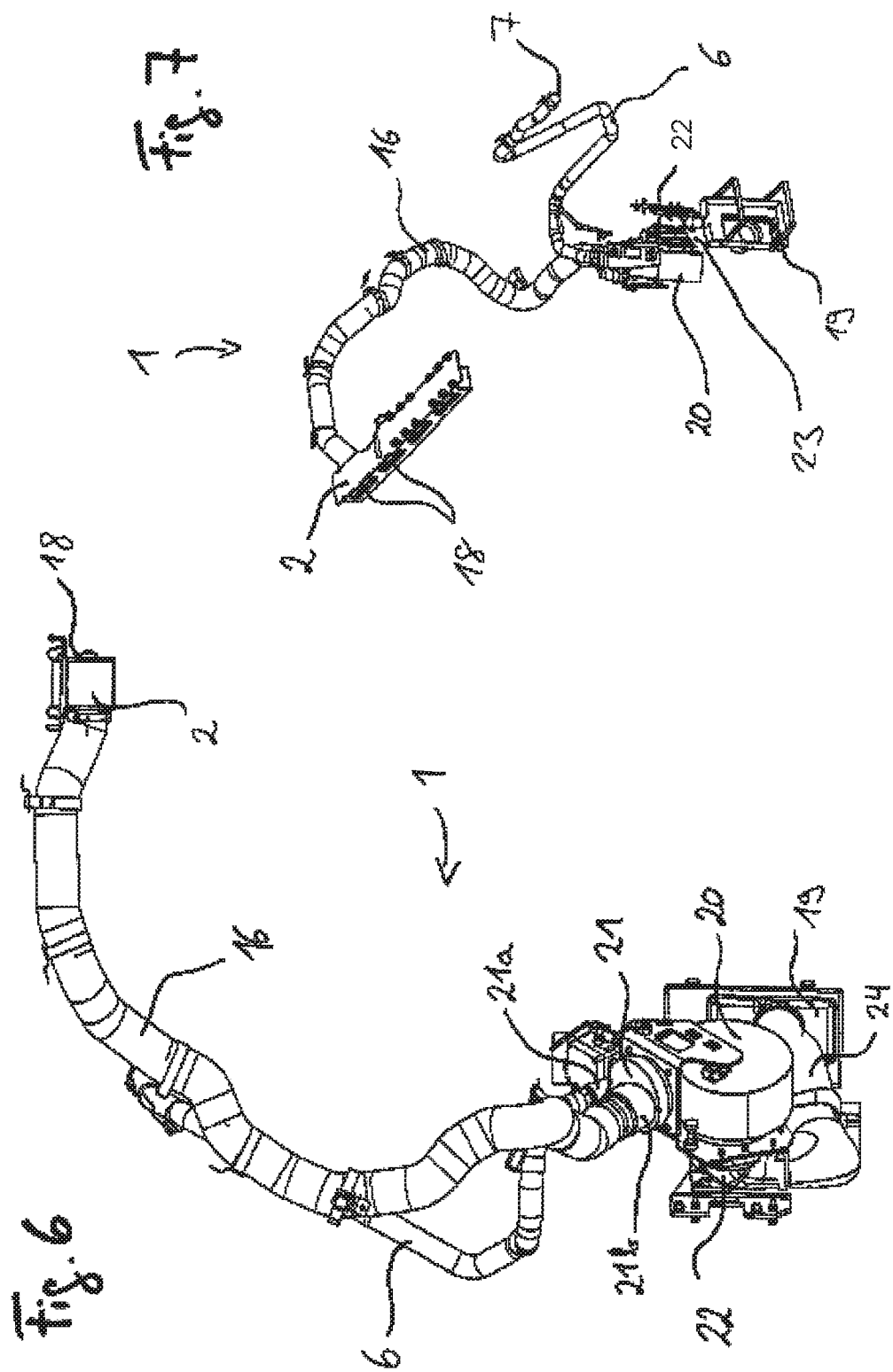

PROPELLANT CHARGE MAGAZINE AND COMBAT COMPARTMENT EQUIPPED WITH A PROPELLANT CHARGE MAGAZINE

The instant application should be granted the priority dates of Dec. 17, 2009, the filing date of the corresponding German patent application 10,2009,058,567.2, as well as Dec 3, 2010, the filing date of the International patent application PCT/DE2010/075154.

BACKGROUND OF THE INVENTION

The present invention relates to a propellant charge magazine as well as to a combat compartment equipped with a propellant charge magazine. The combat compartment can, for example, be part of a firing module equipped with an automatic, large caliber weapon system, or of a gun turret, for example of a tank or an armored howitzer.

It is basically known to connect a combat compartment to an air supply system for cooling purposes.

Such an air supply system is described, for example, in EP 1 060 917 B1. With this known system it was attempted to cool the combat compartment in general, which during stationary operation required a high cooling capacity and thus necessitated a large installation space.

It is furthermore known to dispose on or in a combat compartment a propellant charge magazine having a housing or support frame in which a plurality of propellant charges can be stored. For a firing module, this is described, for example, in DE 10 2004 025 743 A1.

Since the function of propellant charges reacts very sensitively to temperature changes, in order to ensure the action readiness of a piece of ordinance, even in climatically hot zones, the propellant charges require a particular cooling, which further increases the overall required cooling capacity.

It is an object of the present invention to ensure an adequate cooling of a propellant charge magazine and/or in a combat compartment that is preferably achieved with a cooling capacity demand that is as low as possible.

SUMMARY OF THE INVENTION

One inventive propellant charge magazine having a magazine housing in which a plurality of propellant charges can be disposed is embodied such that a device for the distribution and/or discharge of cooling air, for cooling the propellant charges, is disposed in, or within the immediate vicinity of, the propellant charge magazine. This device for the distribution and/or discharge of cooling air can preferably be connectable to an external cooling air distribution system.

The propellant charge magazine can be embodied as a propellant charge cassette.

Pursuant to the present invention, the propellant charge magazine can also be provided with a cooling air connection for the introduction of cooling air into the magazine housing.

By means of the described configurations, it is possible to introduce cooling air into the propellant charge magazine and to there distribute it, so that the propellant charges can in particular be cooled to a defined temperature.

The device for the distribution and/or discharge of cooling air is, in a particularly preferred manner, disposed in the upper half of the magazine housing, whereby in the lower half of the magazine housing at least one air outlet opening is provided via which the cooling air can be guided out of the magazine housing. This arrangement offers the advantage that the natural circulation of the cool air, which falls downwardly, is taken into consideration.

An inventive combat compartment having a combat compartment housing in which in particular a weapon is disposed is provided with such a propellant charge magazine.

Advantageously, a device for the distribution and/or discharge of cooling air can be disposed in the region of the propellant charge magazine; this device is connected via an air supply line to a cooling air distribution system that is disposed in the combat compartment housing. In this way, the cooling air can thus be blown into the propellant charge magazine housing.

By means of an air supply line, the cooling air can be supplied via a cooling air connection, in particular an opening in the magazine housing, from the cooling air distribution system of the combat compartment housing to the device for the distribution and/or discharge of cooling air.

The air outlet openings of the magazine housing can be disposed on a side of the magazine housing that faces the interior of the combat compartment housing. In this way, it is possible to convey the cooling air that leaves the propellant charge magazine into the combat compartment for further utilization in order to also cool this compartment.

In a particularly preferable manner, the device for the distribution and/or discharge of cooling air can be connected with the cooling air distribution system via a detachable coupling. In this way, it is also possible to realize the advantage that the magazine housing is disposed on an outer wall of the combat compartment housing in a removable or movable manner, so that it can be exchanged, for example for the resupply of munitions.

Pursuant to one advantageous further development, the temperature in the magazine and/or of the propellant charges can be determined with a temperature sensor. A propellant charge is preferably provided with a temperature sensor by means of which the temperature of the propellant charge can be determined. By means of a temperature measurement, it is possible to carry out a method according to which the temperature of the propellant charge is automatically measured up to just prior to firing, and the temperature value can be input into the firing control computer for the determination of a firing control solution. Furthermore, by means of the temperature measurement the temperature in the magazine can be regulated. For this purpose, the measured temperature can be supplied to a control device that is connected with the device for the distribution and/or discharge of cooling air. The temperature signals can be transmitted to a receiver or to the control device, especially wirelessly, for the evaluation.

The temperature sensor can be disposed in the magazine housing of the propellant charge magazine. The temperature sensor can also be disposed on the outer side, for example the end face, of the propellant charge, where it can be adhesively applied or can be secured in some other fashion. The temperature sensor can also be disposed in the interior of the propellant charge, which enables a particularly precise determination of the core temperature.

Pursuant to a particularly advantageous embodiment of the propellant charge, the temperature sensor is interconnected with a transmitter, in particular an RFID-Chip (RFID: Radio Frequency Identification), for the transmission of a temperature signal. This configuration offers the possibility of at any time being able to wirelessly interrogate for the temperature of the propellant charge, to generate a temperature signal, and to convey this to the firing control computer. For this purpose, a device for the determination of a firing control solution, while taking into consideration the temperature of the propellant charge, can be provided with a receiver for receiving the temperature signal on the basis of the temperature of the propellant charge measured by the temperature sensor.

An inventive combat compartment has a combat compartment housing, whereby a cooling air distribution system disposed in the combat compartment housing has an air discharge device that is disposed in an upper portion of the combat compartment housing in such a way that the cooling air can be guided into at least one lateral area of the combat compartment housing, whereby the combat compartment is embodied such that by means of at least one guide surface or deflector, the cooling air can be guided downwardly in the lateral area of the combat compartment housing and upwardly in the central area of the combat compartment housing.

The air discharge device of the cooling air distribution system can be disposed below the roof of the combat compartment housing. Thus, the cooling air can settle downwardly in the lateral area on the basis of natural thermal principles and can warm up, whereby the warmer air can then rise upwardly in the central area of the vehicle. On the whole, in this way a good distribution of the cooling air in the combat compartment is achieved.

The cooling air in the upper central area can preferably be conveyed out of the combat compartment housing via an outlet opening.

The outlet opening can be disposed in a discharge device, in particular a ballistically protected discharge device, that is disposed on the combat compartment housing. An axial-flow fan can be disposed in the discharge device, so that the cooling air is actively guided out of the combat compartment. The discharge device can furthermore be provided with a discharge conduit that is guided on the roof of the combat compartment housing and at the outer rim of the room is bent or angled downwardly. In a particularly preferred manner, filters and/or flow-impeding elements, such as baffle plates, are disposed in this discharge conduit. These serve to prevent contaminated atmospheric air from possibly passing in a simple and/or unfiltered manner into the combat compartment.

From the air discharge device of the magazine housing, the cooling air can be guided into that lateral area of the combat compartment housing that faces away from the magazine housing. Thus, the cooling air that flows through the propellant charge magazine can be used for the cooling of the combat compartment.

The air discharge device can furthermore be connected to a supply conduit that is guided from the bottom region of the combat compartment housing to a prescribed height above the base of the housing.

In a particularly preferred manner, the cooling air is introduced into both lateral areas, so that the cooling air can be guided downwardly in both lateral areas of the combat compartment.

It is particularly advantageous if the air supply line to the propellant charge magazine is connected to the supply conduit of the combat compartment housing in the bottom region of the combat compartment housing.

Pursuant to the present invention and by means of a targeted cooling, the advantage can be achieved that in any case in the region of the propellant charge magazine the temperature in the combat compartment does not exceed a permissible maximum value. A further advantage is the achievement of the aforementioned objective of a cooling capacity that is as low as possible in the combat compartment due to an as optimum as possible of an air discharge device for the cooling air, and an able guidance of the cooling air that flows through the combat compartment. Due to the direct connection of the coolable propellant charge magazine to the cooling system of the combat compartment, the propellant charge magazine represents a separate cooling zone in the combat compartment in which lower temperatures than in the combat compartment are present due to the smaller volume that has to be cooled. Thus, the cooling air can be supplied to the propellant charge magazine prior to entering the combat compartment, where it is heated up.

Within the combat compartment, the region of the propellant charge magazine can be cooled in a deliberate manner, while the remaining space serves for the circulation and the withdrawal of the heat Due to this directed cooling and withdrawal of the heat, the overall required cooling capacity can be significantly reduced. In addition, the advantage can be achieved of holding the propellant charges to a defined temperature, thus improving the firing precision of the weapon, since the temperature of the propellant charges has an impact upon the ballistics.

An embodiment for the invention will be explained in greater detail subsequently with the aid of the accompanying FIGS. 1 to 7.

BRIEF DESCRIPTION OF THE DRAWINGS

The drawings show:

FIG. 3 a perspective view of the propellant charge magazine that can be placed on the firing module of FIGS. 1 and 2;

FIG. 4 a vertical cross-section through the propellant charge magazine of FIG. 3;

FIG. 5 a vertical partial section that extends in the longitudinal direction through the firing module of FIG. 1;

FIG. 6 the cooling air distribution system of FIG. 2; and

FIG. 7 the cooling air distribution system of FIG. 6 in a rotated perspective.

DESCRIPTION OF SPECIFIC EMBODIMENTS

Figure 1:
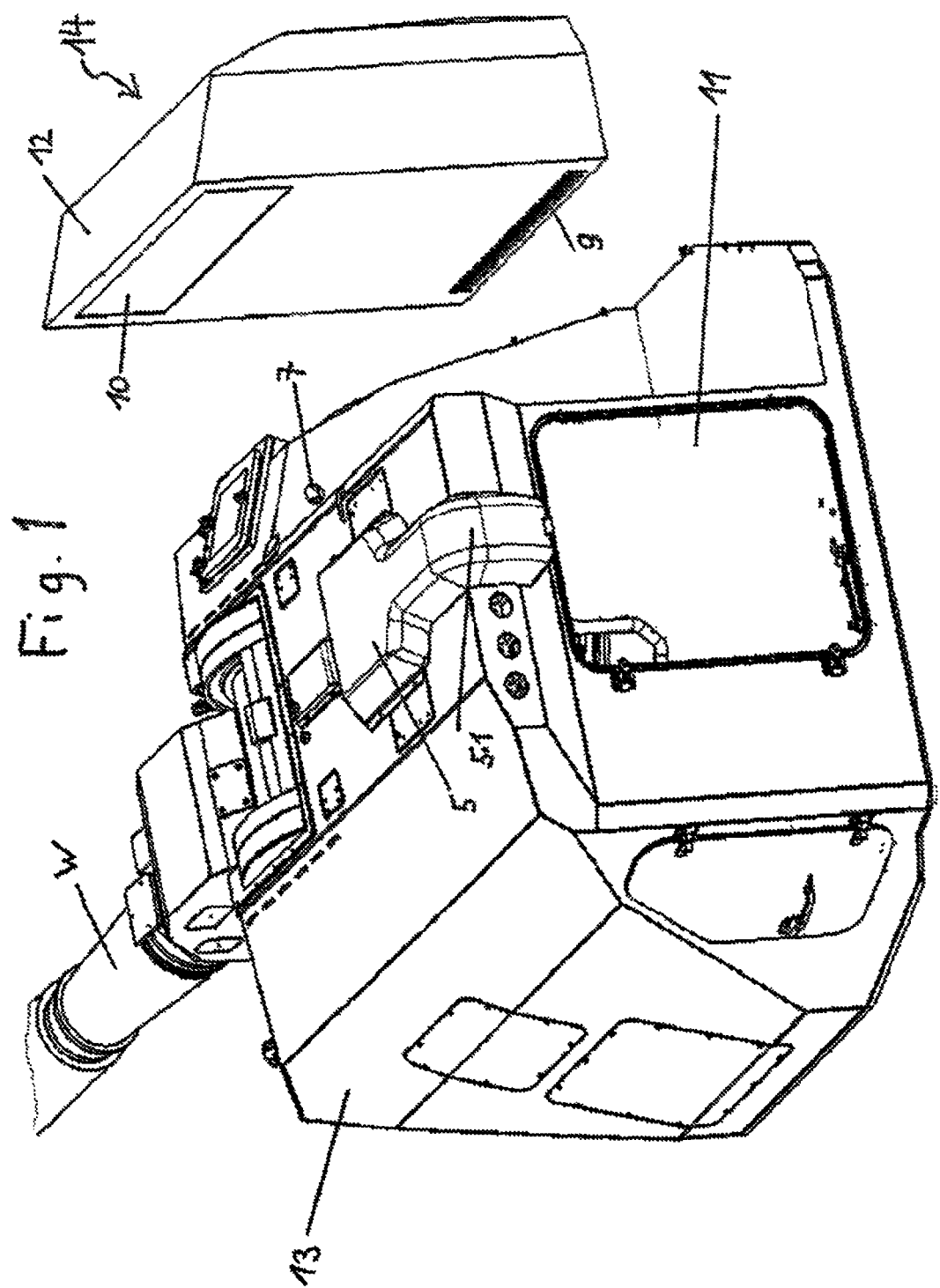
FIG. 1 a perspective, partially exploded view of a firing module having a propellant charge magazine that can be placed on a firing module.
Figure 2:
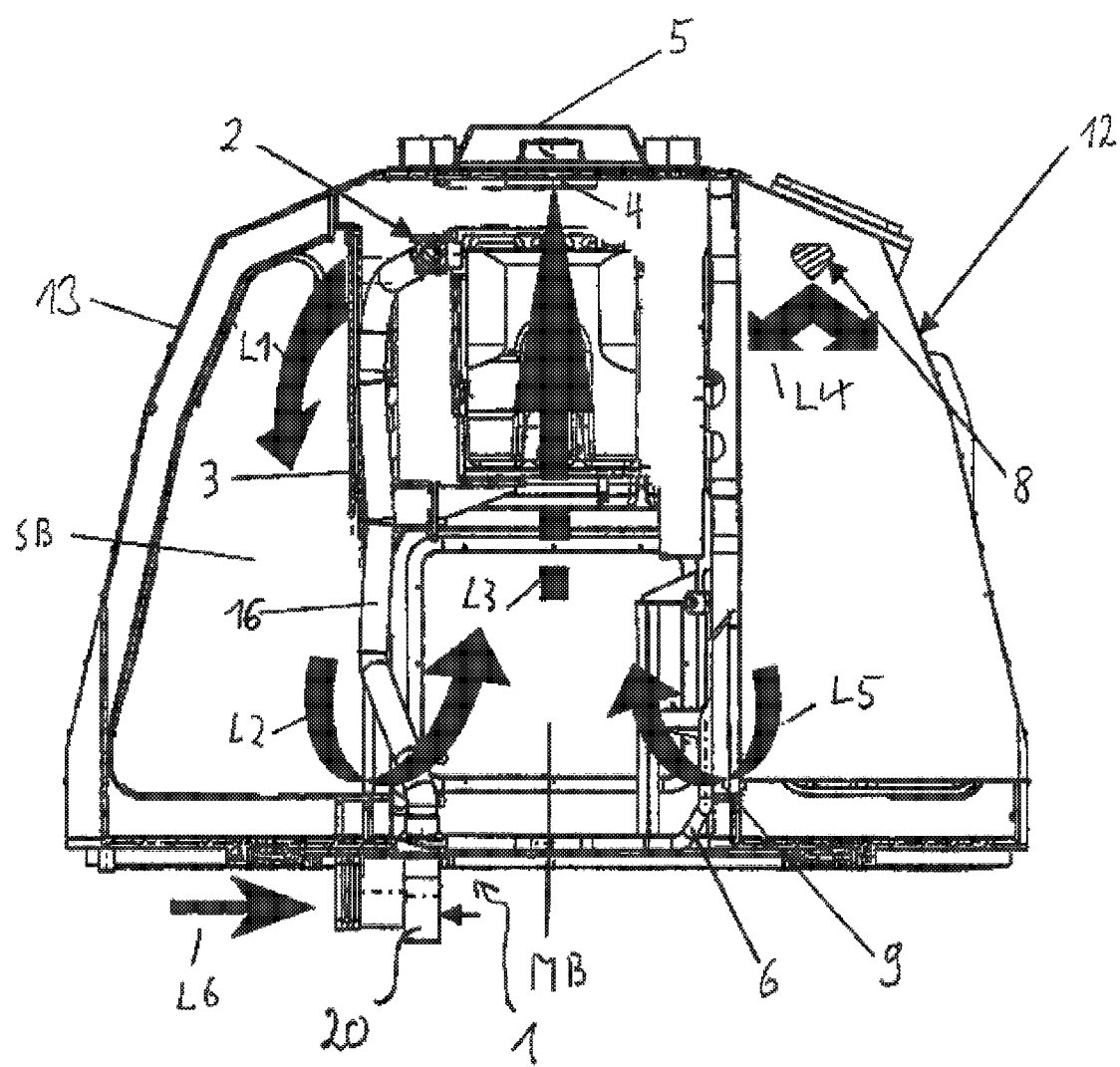
FIG. 2 a vertical cross-section through the combat compartment of the firing module of FIG. 1.

The firing module illustrated in FIGS. 1 and 2, which forms the combat compartment, can be embodied as the turret of a tank or armored howitzer, which is otherwise not illustrated, and has an armored combat compartment housing 13 in which is disposed a heavy weapon W, which is pivotable in elevation, as well as a munitions magazine. Disposed in the interior of the combat housing 13 is the combat compartment, which is accessible via an entry door 11 at the rear of the housing 13. A propellant charge magazine 14 having a magazine housing 12 can be disposed on the outer side of the combat compartment housing 13 on an outer wall that is disposed within a resilient area of the contour of the housing 13.

The propellant charges 15 (FIG. 4), which are disposed in the propellant charge magazine 14, which is designed as a propellant charge cassette, can, by means of non-illustrated supply mechanisms, be conveyed out of the propellant charge magazine 14 into the combat compartment via an opening 10 in that wall of the magazine housing 12 that faces the housing 13, and can be supplied to the weapon W.

The propellant charge magazine thus essentially corresponds to the propellant charge magazine of DE 10 2004 025 743 A1, whereby the configuration described therein is hereby incorporated by reference into the present application.

In addition to the propellant charge magazine described in DE 10 2004 025 743 A1, the propellant charge magazine of the present invention can be cooled. For this purpose, it is provided with a cooling air connection 17, a device 8 for the delivery and distribution of the cooling air, as well as air outlet openings 9.

The propellant charge magazine 14 can be connected to the cooling air system 1 of the combat compartment. For this purpose, disposed on the side of the magazine housing 12, in the upper half, is a cooling air connection 17 that can be configured as a connecting piece or adaptor, or simply as an opening, such as a bore. By means of the cooling air connection 17, the cooling air is conveyed to a device 8 that is disposed within the magazine housing 12 for the delivery and distribution of cooling air, which device 8 distributes and discharges the cooling air within the magazine housing 12.

Disposed in the magazine housing 12 is a temperature sensor 27 for determining the temperature in the housing 12. The temperature can be conveyed to a control device, so that the temperature in the housing 12 can be regulated to a prescribed value. The temperature can also be measured with a temperature sensor 28, which is disposed directly on a propellant charge 15.

A firing control solution can then be determined in a firing control computer taking into consideration the temperature of the propellant charge 15. The corresponding interrelationships between temperature of the propellant charge 15 and the firing control solution, in particular the firing range, are stored in the firing control computer.

As can be seen in FIG. 3, the device 8, which is connected to the cooling air connection 17, essentially extends over the entire length of the magazine, so that the cooling air can be effectively distributed in the magazine housing 12. The device 8 is provided with a plurality of air outlet openings 25 for the discharge of the cooling air, with the openings in particular enabling a radial air discharge within the magazine housing 12. To this extent, the device 8 can be embodied as a radial distributor. The device 8 has air outlet or discharge openings 25 on two oppositely disposed sides, so that the cooling air can be discharged in a plurality of directions L4, in particular directions that are disposed at right angles to one another. The device is secured within the propellant charge magazine 14 on the top wall of the magazine housing 12 (see reference numeral 26 in FIG. 4).

For the realization of the present invention, the device 8 need not necessarily be in the form of the illustrated radial distributor. A straightforward device for the discharge or delivery of cooling air would also be achieved by an opening in the magazine housing 12 that can be connected to the cooling air system, and via which the cooling air can be discharged into the propellant charge magazine 14.

The cooling air delivered by the device 8 flows downwardly in the direction of the arrows L4 over and past the propellant charges 15, and exits via a grating having discharge openings 9 in the bottom region of the magazine housing 12. The discharge openings 9 are disposed in the same side wall as are the openings 10, i.e. in a side wall that faces the combat compartment of the combat compartment housing 13. The discharge openings 9 are disposed in a side wall of the magazine housing that is disposed at right angles to the side wall having the cooling air connection 17.

The cooling air connection 17 of the device 8 for the delivery and distribution of the cooling air is connected to an air supply line 6 of a cooling air distribution system 1 of the combat compartment housing 13. Disposed at the end of the air supply line 6 is an opening 7, which is disposed across from the cooling air connection 17. By means of this coupling the cooling air can be guided out of the combat compartment and into the magazine housing 12.

It is possible for the cooling air line to the propellant charges to be composed of two line portions. A first line portion 6 is guided through the combat compartment housing 13, while a second line portion 8 is guided through the magazine housing 12. A detachable coupling for connection of the portions is disposed between the line portions 6 and 8.

In the bottom region of the combat compartment housing 13, the air supply line 6 is connected to a main line or conduit 18 of the cooling air system 1, which main line includes hoses and/or tubes for the air supply.

The cooling air distribution system 1 for the combat compartment within the combat compartment housing 13 is established in the following manner: from a non-illustrated refrigerator or cooler that is disposed below the combat compartment housing 13, for example in a vehicle pan, the cooling air is guided in the direction of the arrow L6 into the supply conduit 16, which extends from the bottom region of the combat compartment housing 13 up to the region directly below the roof of the combat compartment housing 13, where it is connected to an air outlet or discharge device 2. The arrangement of this air discharge device 2 is such that the air, in a non-illustrated manner, is, in the longitudinal direction of the combat compartment, distributed in the direction of the arrow L1 into the lateral area SB of the combat compartment, shown at the left side in FIG. 2, where it is guided downwardly by means of a guide surface or deflector 3, which can be embodied as a deflection plate. However, the deflector can also be part of the side wall of a device that is disposed in the combat compartment, or can be part of the inner lining. The air that is guided downwardly in the side or lateral area SB is then guided, in the direction of the arrow L2, into the central area MB of the combat compartment, where it flows upwardly in the direction of the arrow L3 to an air outlet opening 4 in the roof of the combat compartment housing 13.

As can be seen in FIG. 2, two cooling air streams, which join in the central area MB, flow through the combat compartment of the combat compartment housing 13. One of these cooling air streams is guided in the direction of the arrows L1 and L2 for cooling the combat area, while the other cooling air stream flows through the magazine housing 12 in the direction of the arrows L4 and L5 for a targeted and efficient cooling of the propellant charge magazine 14, and then enters into the combat compartment and thus contributes to the cooling of the combat compartment.

To ensure a safe and ballistically protected withdrawal of the exiting cooling air, a discharge device 5 is disposed on the roof of the combat compartment housing 13 over the outlet opening 4; as can be seen in FIGS. 1 and 5, the discharge device has a discharge conduit 5.1 that is guided to the rear rim of the combat compartment housing 13, where it is angled off downwardly. Disposed in the outlet opening 4, within the housing, is an axial-flow fan 5.3, by means of which the cooling air is withdrawn from the combat compartment through the outlet opening 4, and is conveyed into the discharge conduit 5.1. Filter elements 5.2 are disposed in the discharge conduit 5.1 in order to prevent dust and dirt from entering the combat compartment. The air exits the discharge conduit 5.1 in the direction of the arrow L7.

FIGS. 6 and 7 show the cooling air distribution system 1. Disposed in the pan of the vehicle is a non-illustrated cooling air generator above which, via bands, is placed an attachment element 19 in order to deliver the cooling air onward. A conduit section 24 leads from the attachment element 19 to a transfer connector 22 that is secured to the pan. In one index position of the rotatable gun turret, a blower 20 that draws in air is disposed across from the transfer connector 22. The blower is disposed on the turret side, so that the air transfer connector 22 and the blower 20 form the air transfer location 23 between pan and the rotating combat compartment.

Disposed on the blower 20 is a Y-shaped distributor 21, the one outlet 21b of which leads to the main conduit 16, which at its end is connected with the air discharge device 2, which is provided with a plurality of laterally directed air openings 18. Disposed at the second opening 21a of the Y distributor 21 is the branch line 6, which at its end leads to the opening 7 of the combat compartment housing and thus leads to the coolable propellant charge cassette 14.

The specification incorporates by reference the disclosure of German 10,2009,058,567.2 filed Dec. 17, 2009, as well as International application PCT/DE2010/075154 filed Dec. 3, 2010.

The present invention is, of course, in no way restricted to the specific disclosure of the specification and drawings, but also encompasses any modifications within the scope of the appended claims.

The invention claimed is:

1. A combat compartment comprising:
    a compartment housing;
    a propellant charge magazine having a magazine housing in which a plurality of propellant charges can be disposed;
    a device for distribution and/or discharge of cooling air, for cooling propellant charges in the magazine housing, wherein the device for distribution and/or discharge of cooling air is disposed in the propellant charge magazine;
    a cooling air distribution system disposed in the combat compartment housing, wherein the cooling air distribution system includes an air discharge device that is disposed in an upper portion of the combat compartment housing and is configured such that the cooling air can be guided into at least one lateral area of the combat compartment housing; and
    at least one deflector for guiding cooling air downwardly in the at least one lateral area of the combat compartment housing, and upwardly in a central area of the combat compartment housing, and which further comprises a supply conduit that extends from a base region of the combat compartment housing to a prescribed height above the base of the combat compartment housing, wherein the air discharge device is connected to the supply conduit.

2. A combat compartment according to claim 1, wherein cooling air is adapted to be conveyed downwardly in two lateral areas of the combat compartment housing.

3. A combat compartment according to claim 1, which further comprises an air supply line that leads to the propellant charge magazine, wherein in a bottom region of the combat compartment housing, the air supply line is connected to the supply conduit of the combat compartment housing.

4. A combat compartment according to claim 1, wherein cooling air is adapted to be conveyed downwardly in two lateral areas of the combat compartment housing.

5. A combat compartment according to claim 1, which further comprises an air supply line that leads to the propellant charge magazine, wherein in a bottom region of the combat compartment housing, the air supply line is connected to the supply conduit of the combat compartment housing.

6. A combat compartment according to claim 1, wherein an upper portion of the central area of the combat compartment housing is provided with an outlet opening for conveying cooling air out of the combat compartment housing.

7. A combat compartment according to claim 6, which further comprises a discharge device that is disposed on the combat compartment housing that is provided with the outlet opening and is ballistically protected.

8. A combat compartment according to claim 7, wherein an axial-flow fan is disposed in the discharge device.

9. A combat compartment according to claim 7, wherein the discharge device is provided with a discharge conduit that is guided on the roof of the combat compartment housing, and at an outer rim of the roof the discharge conduit is bent or angled downwardly.

10. A combat compartment according to claim 9, wherein filters and/or baffle plates are disposed in the discharge conduit.

11. A combat compartment according to claim 1, wherein the device for distribution and/or discharge of cooling air is connectable to an external cooling air distribution system.

12. A combat compartment according to claim 1, wherein the device for distribution and/or discharge of cooling air is disposed in an upper half of the magazine housing, and wherein a lower half of the magazine housing is provided with at least one air outlet opening (9) for conveyance of cooling air out of the magazine housing.

13. A combat compartment according to claim 12, wherein the magazine housing is provided with air outlet openings that are disposed on a side of the magazine housing that faces an interior of the combat compartment housing.

14. A combat compartment according to claim 1, wherein the magazine housing is disposed on an outer wall of the combat compartment housing in a removable or movable manner.

15. A combat compartment comprising:
    a combat compartment housing;
    propellant charge magazine having a magazine housing in which a plurality of propellant charge can be disposed;
    a device for distribution and/or discharge of cooling air, for cooling propellant charges in the magazine housing, wherein the device for distribution and/or discharge of cooling air is disposed in the propellant charge magazine;
    a cooling air distribution system disposed in the combat compartment housing, wherein the cooling air distribution system includes an air discharge device that is disposed in an upper portion of the combat compartment housing and including a downwardly angled discharge conduit, and is configured such that the cooling air can be guided into at least one lateral area of the combat compartment housing, the discharge device disposed on the combat compartment housing and is ballistically protected, and wherein the discharge device is provided with a discharge conduit that is guided on the roof of the combat compartment housing, and at an outer rim of the roof the discharge conduit is bent or angled downwardly; and
    at least one deflector for guiding cooling air downwardly in the at least one lateral area of the combat compartment housing, and upwardly in a central area of the combat compartment housing, wherein an upper portion of the central area of the combat compartment housing is provided with an outlet opening for conveying cooling air out of the combat compartment housing.

* * * * *